No. 738,087. PATENTED SEPT. 1, 1903.
S. TRUITT.
DRAG SAW.
APPLICATION FILED OCT. 23, 1902.
NO MODEL. 2 SHEETS—SHEET 1.
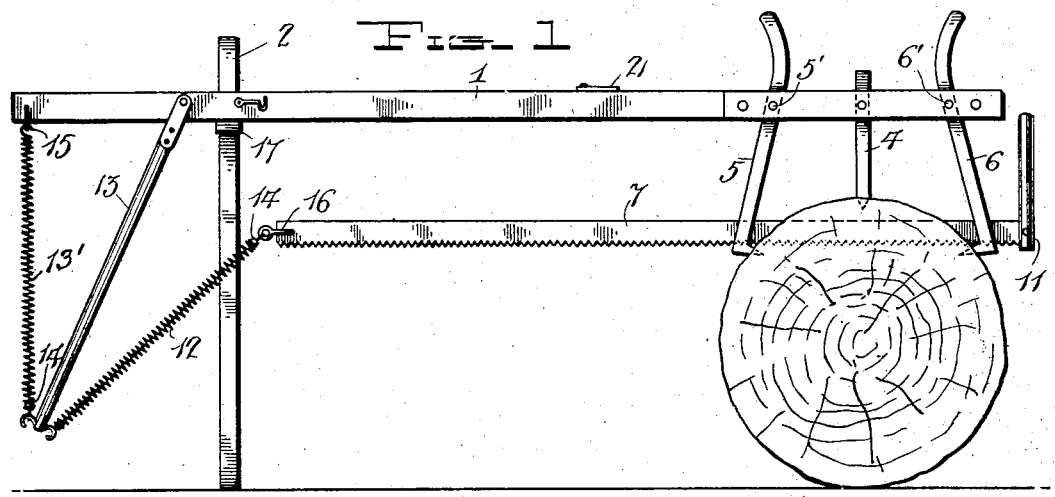
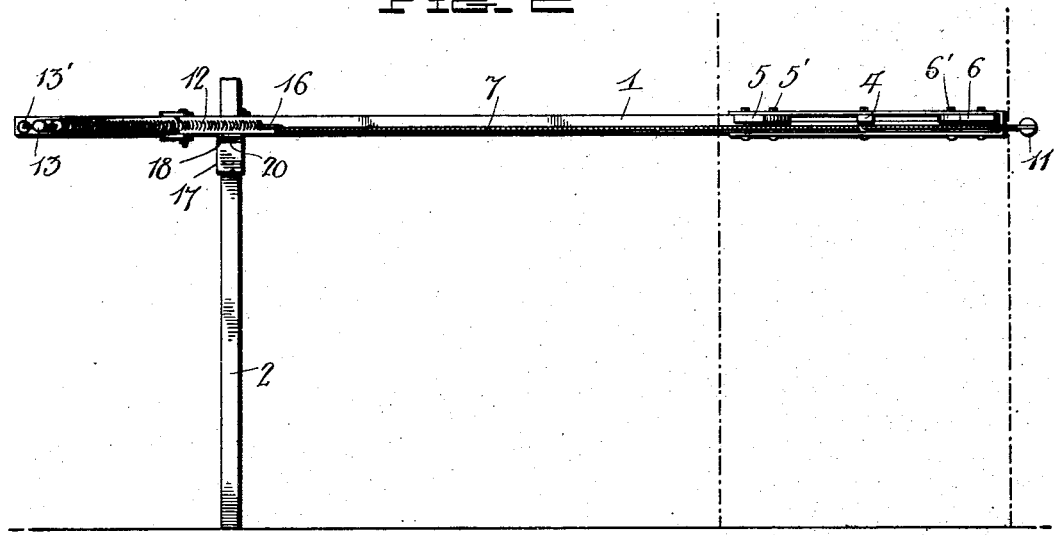
Inventor
Samuel Truitt
Witnesses
By H. B. Willson &co
Attorneys
THE NORRIS PETERS CO., PHOTO-LITHO., WASHINGTON, D. C.

No. 738,087. PATENTED SEPT. 1, 1903.
S. TRUITT.
DRAG SAW.
APPLICATION FILED OCT. 23, 1902.
NO MODEL. 2 SHEETS—SHEET 2.
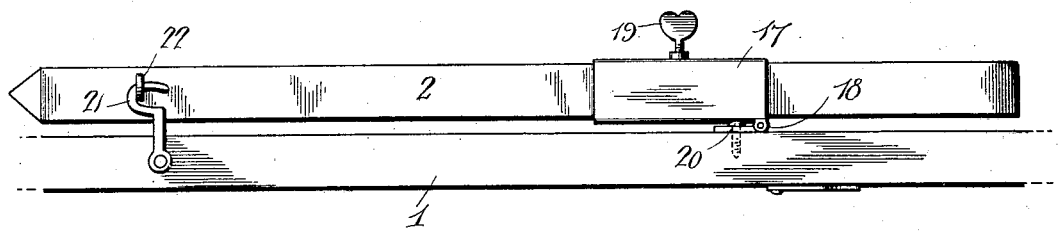
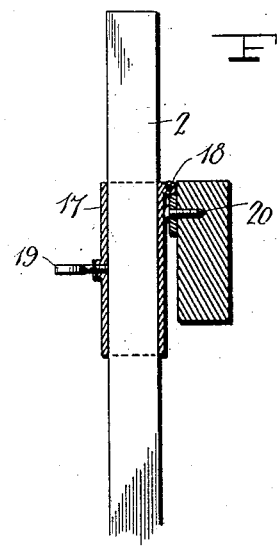
Witnesses
Inventor
Samuel Truitt
By
Attorneys No. 738,087.

Patented September 1, 1903.

UNITED STATES PATENT OFFICE.

SAMUEL TRUITT, OF GUTHRIE, OKLAHOMA TERRITORY.

DRAG-SAW.

SPECIFICATION forming part of Letters Patent No. 738,087, dated September 1, 1903.

Application filed October 23, 1902. Serial No. 128,456. (No model.)

*To all whom it may concern:*

Be it known that I, SAMUEL TRUITT, a citizen of the United States, residing at Guthrie, in the county of Logan and Territory of Oklahoma, have invented certain new and useful Improvements in Drag-Saws; and I do declare the following to be a full, clear, and exact description of the invention, such as will enable others skilled in the art to which it appertains to make and use the same.

This invention relates to drag-saws.

The object of the invention is to provide a drag-saw which is simple of construction, durable in use, and efficient for sawing trees or logs, which is readily transportable, which is adapted to be firmly clamped to a tree or log, and which is readily adjustable to operate vertically for sawing logs or horizontally for sawing down trees.

With this and other objects in view the invention consists in certain features of construction and combination of parts which will be hereinafter fully set forth.

In the accompanying drawings, Figure 1 is a side elevation showing the device adjusted for vertical work, as for sawing logs. Fig. 2 is a similar view showing the device adjusted for horizontal work, as for sawing down trees. Fig. 3 is a top plan view showing the frame folded for transportation. Fig. 4 is a section through the beam and sleeve. Fig. 5 is a detail section illustrating the connection of the dogs. Fig. 6 is a detail section illustrating the manner of connecting the screw-eyes to the springs.

Referring now more particularly to the drawings, 1 represents a bar or beam provided at one end with a supporting-leg 2, forming therewith a frame for the operating connections of the saw. At its opposite end the bar carries a spur 4, on the opposite sides of which are arranged two dogs 5 6. The free ends of the dogs are spurred, so as to be forced into the log or tree to hold one end of the beam stationary, the other end of the beam being supported by the leg 2. A clamp to impinge against the log or tree may be substituted for the spur.

The saw 7 is provided at one end with an operating-handle 11 and at its opposite end is connected by a coiled spring 12 to a swinging bar 13, which is pivoted to the bar 1 and connected at its free end thereto by a coiled spring 13'. These springs are so arranged as to perform the function of drawing back or retracting the saw in the usual manner. In the ends of the springs are inserted wooden plugs 14, receiving screw-eyes 15, which connect with hooks, screw-eyes, or other suitable coöperating connecting members 16 on the saw, lever, and bar. This construction provides a secure means of fastening the eyes 15 on the ends of the springs.

The leg 2 carries a sliding sleeve 17, which has rigidly fastened thereto one leaf of a hinge 18 and which is provided with a setscrew 19 for securing it in adjusted position on the leg. The other leaf of the hinge is pivotally connected by a pin or screw 20 to one side of the beam 1. By this construction the leg may be folded parallel with the beam, adjusted to support the beam at any desired elevation from the ground, and arranged so as to stand vertically and serve as a support in either of the two positions of the saw shown in Figs. 1 and 2. When it is desired to fold the frame for convenient transportation, the leg 2 is swung up parallel with the beam, as shown in Fig. 3, and held in such position by engaging a hook 21 on the beam with an eye 22 on the free end of the leg. The saw connections may then be detached, if desired, to enable the parts to be packed in close compass for storage or shipment.

In employing the saw for sawing down trees the beam 1 is turned up on the hinge 18 from the position shown in Fig. 1 to a position at right angles thereto, as shown in Fig. 2, thus setting the saw horizontally for work. In either position of the saw shown in Figs. 1 and 2 the sleeve 17 admits of the adjustment of the bar 1 on the leg 2, so that the saw may be positioned at any desired height from the ground-surface.

The set-screw 19 may be made to impinge directly against the leg, or in lieu thereof a bolt or pin may be employed to enter either one of a series of openings formed in the leg, whereby the bar may be set at different elevations. This obvious modification will be readily understood without illustration.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a drag-saw, a frame-beam, a leg, a sleeve slidably mounted on the leg and having a double pivotal connection with the beam admitting of the beam being horizontally or vertically disposed and the sleeve being arranged at right angles to or parallel with the beam, substantially as described.

2. In a drag-saw, a frame-beam, a leg, a sleeve slidable on the leg, a hinge connecting the sleeve and beam and adapting the beam to be turned to a horizontal or vertical position, said hinge having a pivotal connection with one of said parts, whereby the leg is adapted to be folded parallel with the beam, means for adjustably securing the sleeve to the leg, and means for securing the leg when folded to the beam, substantially as described.

In testimony whereof I have hereunto set my hand in presence of two subscribing witnesses.

SAMUEL TRUITT.

Witnesses:
R. R. MEACHAM,
WM. WILSON.